(12) United States Patent
Chintakindi

(10) Patent No.: US 11,726,437 B2
(45) Date of Patent: Aug. 15, 2023

(54) VEHICLE CONTROL SYSTEMS

(71) Applicant: Allstate Insurance Company, Northbrook, IL (US)

(72) Inventor: Sunil Chintakindi, Menlo Park, CA (US)

(73) Assignee: Allstate Insurance Company, Northbrook, IL (US)

( * ) Notice: Subject to any disclaimer, the term of this patent is extended or adjusted under 35 U.S.C. 154(b) by 274 days.

(21) Appl. No.: 17/005,736

(22) Filed: Aug. 28, 2020

(65) Prior Publication Data

US 2021/0055735 A1 Feb. 25, 2021

Related U.S. Application Data

(63) Continuation of application No. 15/991,684, filed on May 29, 2018, now Pat. No. 10,809,730, which is a (Continued)

(51) Int. Cl.
*G05D 1/02* (2020.01)
*B60T 7/18* (2006.01)
(Continued)

(52) U.S. Cl.
CPC ........... *G05D 1/0214* (2013.01); *B60Q 1/085* (2013.01); *B60Q 1/46* (2013.01); *B60Q 1/50* (2013.01);
(Continued)

(58) Field of Classification Search
None
See application file for complete search history.

(56) References Cited

U.S. PATENT DOCUMENTS 6,092,014 A 7/2000 Okada
6,154,658 A 11/2000 Caci
(Continued)

FOREIGN PATENT DOCUMENTS

EP 3303083 A1 4/2018
EP 3417240 A1 12/2018

OTHER PUBLICATIONS

International Preliminary Report on Patentability for International Application No. PCT/US2017/033089, dated Dec. 27, 2018, 10 Pages.

(Continued)

*Primary Examiner* — Tamara L Weber
(74) *Attorney, Agent, or Firm* — Polsinelli PC

(57) ABSTRACT

Apparatuses, systems, and methods are provided for the utilization of vehicle control systems to cause a vehicle to take preventative action responsive to the detection of a near short term adverse driving scenario. A vehicle control system may receive information corresponding to vehicle operation data and ancillary data. Based on the received vehicle operation data and the received ancillary data, a multi-dimension risk score module may calculate risk scores associated with the received vehicle operation data and the received ancillary data. Subsequently, the vehicle control systems may cause the vehicle to perform at least one of a close call detection action and a close call detection alert to lessen the risk associated with the received vehicle operation data and the received ancillary data.

20 Claims, 6 Drawing Sheets

Related U.S. Application Data continuation of application No. 15/183,287, filed on Jun. 15, 2016, now Pat. No. 10,019,009.

(51) Int. Cl.

| | | |
|---|---|---|
| *B60T 7/22* | (2006.01) | |
| *B60Q 1/46* | (2006.01) | |
| *B60Q 9/00* | (2006.01) | |
| *B60Q 1/08* | (2006.01) | |
| *G06N 7/01* | (2023.01) | |
| *B60Q 1/50* | (2006.01) | |
| *B60R 1/00* | (2022.01) | |
| *B60R 25/00* | (2013.01) | |
| *B60R 25/10* | (2013.01) | |
| *B60T 7/12* | (2006.01) | |
| *G05B 15/02* | (2006.01) | |
| *G05D 1/00* | (2006.01) | |
| *G06Q 40/08* | (2012.01) | |

(52) U.S. Cl.
CPC ............... *B60Q 9/00* (2013.01); *B60Q 9/008* (2013.01); *B60R 1/00* (2013.01); *B60R 25/002* (2013.01); *B60R 25/10* (2013.01); *B60T 7/12* (2013.01); *B60T 7/18* (2013.01); *B60T 7/22* (2013.01); *G05B 15/02* (2013.01); *G05D 1/0088* (2013.01); *G06N 7/01* (2023.01); *G06Q 40/08* (2013.01); *B60Q 2300/45* (2013.01); *B60R 2300/205* (2013.01); *B60T 2201/022* (2013.01); *B60T 2210/36* (2013.01)

(56) References Cited

U.S. PATENT DOCUMENTS

| | | | |
|---|---|---|---|
| 6,735,506 | B2 | 5/2004 | Breed et al. |
| 6,738,697 | B2 | 5/2004 | Breed |
| 6,925,425 | B2 | 8/2005 | Remboski et al. |
| 7,904,219 | B1 | 3/2011 | Lowrey et al. |
| 7,914,187 | B2 | 3/2011 | Higgins-Luthman et al. |
| 8,150,621 | B1 | 4/2012 | Phillips et al. |
| 8,457,827 | B1 | 6/2013 | Ferguson et al. |
| 8,676,466 | B2 | 3/2014 | Mudalige |
| 8,805,707 | B2 | 8/2014 | Schumann, Jr. et al. |
| 8,818,725 | B2 | 8/2014 | Ricci |
| 9,147,353 | B1 | 9/2015 | Slusar |
| 9,188,449 | B2 | 11/2015 | Biswal et al. |
| 9,581,461 | B1 | 2/2017 | Chintakindi et al. |
| 9,915,543 | B2 | 3/2018 | Chintakindi et al. |
| 10,019,009 | B2 | 7/2018 | Chintakindi |
| 2006/0015231 | A1 | 1/2006 | Yoshimura et al. |
| 2006/0047381 | A1 | 3/2006 | Nguyen |
| 2007/0135978 | A1 | 6/2007 | Kim et al. |
| 2008/0167820 | A1 | 7/2008 | Oguchi et al. |
| 2008/0252487 | A1 | 10/2008 | McClellan et al. |
| 2008/0258890 | A1 | 10/2008 | Follmer et al. |
| 2009/0243883 | A1 | 10/2009 | Simon |
| 2010/0106356 | A1 | 4/2010 | Frepagnier et al. |
| 2013/0018677 | A1 | 1/2013 | Chevrette |
| 2014/0052293 | A1 | 2/2014 | Bruemmer et al. |
| 2014/0195106 | A1 | 7/2014 | Mcquade et al. |
| 2014/0244096 | A1 | 8/2014 | An et al. |
| 2014/0309884 | A1* | 10/2014 | Wolf ............... B60W 10/18 701/41 |
| 2015/0025917 | A1 | 1/2015 | Stempora |
| 2015/0088334 | A1 | 3/2015 | Bowers et al. |
| 2015/0112504 | A1 | 4/2015 | Binion et al. |
| 2015/0170287 | A1 | 6/2015 | Tirone et al. |
| 2016/0001781 | A1 | 1/2016 | Fung et al. |
| 2016/0026182 | A1 | 1/2016 | Boroditsky et al. |
| 2016/0086285 | A1 | 3/2016 | Jordan Peters et al. |
| 2016/0112216 | A1 | 4/2016 | Sargent et al. |
| 2016/0171894 | A1 | 6/2016 | Harvey |
| 2016/0267335 | A1* | 9/2016 | Hampiholi ............ B60K 28/06 |

OTHER PUBLICATIONS

Communication pursuant to Article 94(3) EPC for European Patent Application No. 17813755.0 dated May 6, 2022, 7 pages.

Sreevishakh, et al, "Automotive Crash Insight using AMR Sensor System," International Journal of Advanced Research in Computer and Communication Engineering, vol. 4, Issue 5, May 2015, 6 pages.

"Vehicle-to-Vehicle Communication Technology," U.S. Department of Transportation, National Highway Traffic Safety Administration, retrieved from www.safercar.gov/staticfiles/safercar/v2v/V2V_Fact_Sheet_101414_v2a.pdf, 4 pages.

Sep. 9, 2016—U.S. Non-Final Office Action—U.S. Appl. No. 15/183,287.

Feb. 3, 2017—U.S. Final Office Action—U.S. Appl. No. 15/183,287.

May 26, 2017—U.S. Non-Final Office Action—U.S. Appl. No. 15/183,287.

Jun. 9, 2017—(WO) International Search Report—PCT/US17/33089.

Oct. 13, 2017—U.S. Final Office Action—U.S. Appl. No. 15/183,287.

Feb. 26, 2018—U.S. Notice of Allowance—U.S. Appl. No. 15/183,287.

Jul. 1, 2019—U.S. Non-Final Office Action—U.S. Appl. No. 15/991,684.

Oct. 11, 2019—(CA) Office Action—Application No. 3,026,328.

Jan. 13, 2020—(EP) Extended Search Report—Application No. 17813755.0.

Feb. 10, 2021—(EP) Examination Report—App. No. 17813755.0.

Dec. 2, 2020—(CA) Office Action—App. No. 3026328.

Nov. 4, 2020—(IN) First Exam Report—App. No. 201847046117.

* cited by examiner

VEHICLE CONTROL SYSTEMS

CROSS-REFERENCE TO RELATED APPLICATIONS

This application claims priority to and is a continuation of U.S. patent application Ser. No. 15/991,684, filed May 29, 2018, and entitled "Vehicle Control Systems," which is a continuation of U.S. patent application Ser. No. 15/183,287, now U.S. Pat. No. 10,019,009, filed Jun. 15, 2016, and entitled "Vehicle Control Systems," the content of each of which is incorporated herein, by reference, in its entirety.

TECHNICAL FIELD

Aspects described herein generally relate to autonomous, semi-autonomous, and non-autonomous vehicle control systems. More specifically, aspects relate to the utilization of vehicle control systems to cause a vehicle to take to take one or more preventative actions responsive to the detection of near short term adverse driving scenarios.

BACKGROUND

Each year vehicle accidents account for thousands of deaths and millions of serious injuries. While autonomous and semi-autonomous car systems are poised to significantly reduce the number of vehicle accidents and, by extension, the number of accident related fatalities and injuries, such systems are often insufficient with respect to the early detection of adverse driving scenarios in the near short term and providing responses (e.g., driver alerts and vehicle actions) following the detection of such adverse driving scenarios. Thus, arrangements for the early detection of near short term adverse scenarios and providing responses to the detection of such scenarios may be advantageous in preventing accidents and furthering motor vehicle safety.

BRIEF SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations such as those described above, and to overcome other limitations that will be apparent upon reading and understanding the present specification, aspects described herein are directed to apparatuses, systems, and methods for using vehicle control systems to cause a vehicle to take to take preventative actions responsive to the detection of near short term adverse driving scenarios.

A first aspect described herein provides a vehicle control system configured to receive vehicle operation data associated with a vehicle and ancillary data associated with one or more additional vehicles and the surrounding environment of the vehicle. Based on the received vehicle operation data and the received ancillary data, a multi-dimensional risk score module included in the vehicle control system may calculate the risk associated with the received vehicle operation data and the received ancillary data. Responsive to calculating the associated risks, the vehicle control computer may cause the vehicle to perform at least one of a close call detection action and a close call detection alert in order to lessen the calculated or determined risks associated with the received vehicle operation data and the received ancillary data.

A second aspect described herein provides a vehicle control system configured to receive vehicle operation data associated with a vehicle and ancillary data associated with one or more additional vehicles and the surrounding environment of the vehicle. Based on the received vehicle operation data and the received ancillary data, a multi-dimensional risk score module included in the vehicle control system may calculate the risk associated with the received vehicle operation data and the received ancillary data. The vehicle control system may populate a near short term logical table with the calculated risk associated with the received vehicle operation data and the received ancillary data. Subsequently, the vehicle control system may configure computer executable instructions with the near short term logical table. The configured computer executable instructions which, when executed by the vehicle control computer, may cause the vehicle to perform at least one of a close call detection action and a close call detection alert in order to lessen the risks associated with the received vehicle operation data and the received ancillary data.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

Figure 1:
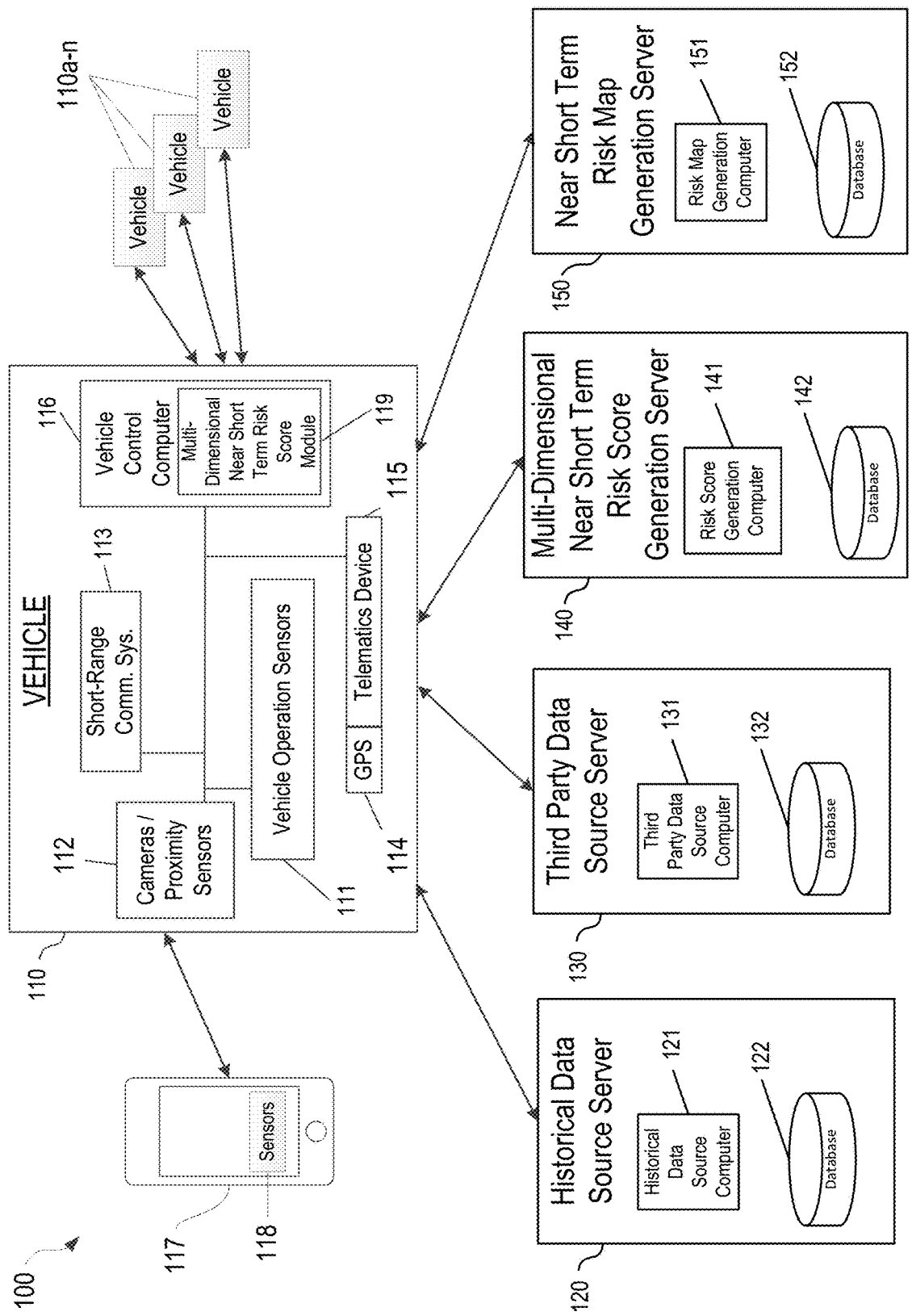
FIG. 1 is a diagram illustrating various example components of a vehicle control system according to one or more aspects of the disclosure.

FIG. 1 is a diagram illustrating various example components of a close call detection system 100 according to one or more aspects of the disclosure. The close call detection system 100 may include a vehicle 110, one or more additional vehicles 110a-n, a mobile computing device 117, a historical data source server 120, a third party data source server 130, a multi-dimensional near short term risk score generation server 140, and a near short term risk map generation server 150. Each component shown in FIG. 1 may be implemented in hardware, software, or a combination of the two. Additionally, each component of the close call detection system 100 may include a computing device (or system) having some or all of the structural components described below for computing device 601.

As discussed above, the vehicle control system 100 shown in FIG. 1 includes a vehicle 110. Vehicle 110 may be an automobile, motorcycle, scooter, bus, van, truck, semi-truck, train, boat, recreational vehicle, or other vehicle. The vehicle 110 may further be an autonomous vehicle, semi-autonomous vehicle, or non-autonomous vehicle. Close call detection system 100 may further include one or more additional vehicles 110*a-n*, which may be similar to vehicle 110. In some examples, vehicle 110 may include vehicle operation and environmental conditions sensors 111 capable of detecting, recording, and transmitting various vehicle performance and/or operational data and environmental conditions data. For example, sensors 111 may detect, store, and transmit data corresponding to the vehicle's speed, distances driven, rates of acceleration or braking, and specific instances of sudden acceleration, braking, swerving, and the like. Sensors 111 also may detect, store and transmit data received from the vehicle's internal systems, such as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, internal decibel levels, maintenance performed on the vehicle, and other data collected by the vehicle's computer systems.

Additional sensors 111 may detect, store, and transmit the environmental and external driving conditions data associated with vehicle 110 including external temperature, precipitation levels, precipitation type, presence of road ice and/or moisture, ambient light levels, presence of fog, and sun position affecting driver visibility. Sensors 111 also may detect, store, and transmit data relating to moving violations and the observance of traffic signals and signs by the vehicle 110. Additional sensors 111 may detect, store, and transmit data relating to the maintenance of the vehicle 110, such as the engine status, oil level, engine coolant temperature, odometer reading, the level of fuel in the fuel tank, engine revolutions per minute (RPMs), and/or tire pressure. Certain vehicle sensors 111 may determine when and how often the vehicle 110 stays in a single lane or strays into other lanes.

The vehicle 110 also may include one or more cameras and proximity sensors 112 capable of recording additional conditions inside and/or outside of the vehicle 110. Internal cameras 112 may detect conditions such as the number of the passengers in the vehicle 110, and potential sources of driver distraction within the vehicle (e.g., pets, phone usage, and unsecured objects in the vehicle). External cameras and proximity sensors 112 may detect other nearby vehicles, traffic levels, road conditions, traffic obstructions, animals, cyclists, pedestrians, and other conditions that may factor into driving trip and/or driving data analyses.

Certain vehicle sensors 111 and/or cameras and proximity sensors 112 may determine when and how often the vehicle 110 stays in a single lane or strays into other lanes. A Global Positioning System (GPS) 114 and/or locational sensors positioned inside the vehicle 110, and/or locational sensors or devices external to the vehicle 110 may be used to determine the lane position of vehicle 110, as well as road type (e.g., highway, entrance/exit ramp, residential area, two lane highway, four lane highway, etc.), road quality (e.g., paved, gravel, dirt, etc.), and other vehicle position/location data.

Vehicle sensors 111 and/or cameras and proximity sensors 112 may be configured to transmit the vehicle performance and operational data and environmental conditions data to one or more internal computing systems including telematics device 115 and/or vehicle control computer 116. Additionally, vehicle sensors 111 and/or cameras and proximity sensors 112 may be configured to independently transmit the above-mentioned data to one or more external computing systems including mobile device 117, historical data source server 120, third party data source server 130, multi-dimensional near short term risk score generation server 140, and near short term risk map generation server 150. In some instances, the data transmission to the one or more external computing systems may be performed via short-range communication systems 113 and/or telematics device 115. In such cases, the vehicle sensors 111 and/or cameras and proximity sensors 112 may be configured to transmit data to the short-range communications systems 113 and/or telematics device 115 which, in turn, may be configured to transmit the data to the one or more external systems. The transmission of data, either externally or internally, from vehicle sensors 111 and/or cameras and proximity sensors 112 may occur seamlessly (e.g., live) and in real-time, or may occur in intermittent bursts (e.g., every 5 seconds, 10 seconds, 1 minute, etc.). In some examples, the transmission of data may occur in offset real-time wherein a time delay (e.g., 1 second, 3 seconds, 10 seconds, etc.) buffers the data transmission.

Short-range communication systems 113 are vehicle-based data transmission systems configured to transmit environmental surroundings and conditions and vehicle performance and operational data to external computing systems and/or other nearby vehicles and infrastructure, and to receive data from external computing systems and/or other nearby vehicles and infrastructure. In some examples, communication systems 113 may use the dedicated short-range communications (DSRC) protocols and standards to perform wireless communications between vehicles and/or external infrastructure such as bridges, guardrails, barricades, and the like.

Short-range communication systems 113 may be implemented using other short-range wireless protocols in other examples, such as WLAN communication protocols (e.g., IEEE 802.11), Bluetooth (e.g., IEEE 802.15.1), or one or more of the Communication Access for Land Mobiles (CALM) wireless communication protocols and air interfaces. In certain systems, short-range communication systems 113 may include specialized hardware installed in vehicle 110 (e.g., transceivers, antennas, etc.), while in other examples the communication systems 113 may be implemented using existing vehicle hardware components (e.g., radio and satellite equipment, navigation computers) or may be implemented by software running on the mobile computing device 117 of drivers and passengers within the vehicle 110. The short-range communication systems 113 may be configured to transmit data provided by vehicle sensors 111 and cameras and proximity sensors 112 to one or more external computing devices and/or vehicles 110*a-n*. Similarly, the short-range communications systems 113 may be configured to receive data from one or more external computing systems and/or vehicles 110*a-n*, which may be configured with similar sensors, cameras and/or other devices, as described above with respect to vehicle 110.

Such data may be utilized in the determining the close call detection alerts described herein.

Figure 6:
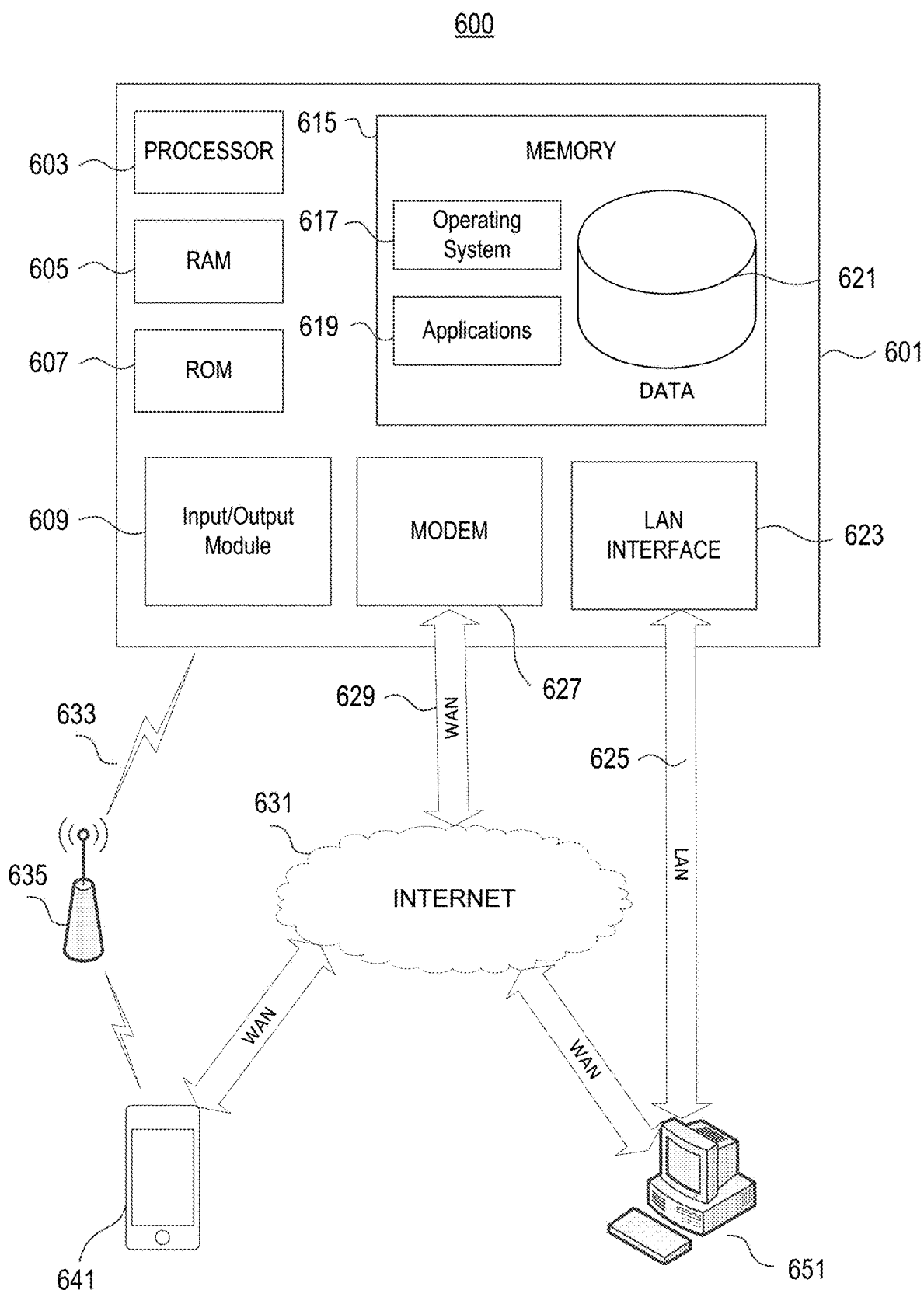
FIG. 6 illustrates an example network environment and computing systems that may be used to implement aspects of the disclosure.

Telematics device 115 may be a computing device containing many or all of the hardware/software components as the computing device 601 depicted in FIG. 6. The telematics device 115 may receive vehicle performance and/or operational data and environmental conditions data from vehicle sensors 111 and cameras and proximity sensors 112, and may be configured to transmit the data to one or more external computer systems over a wireless transmission network.

Telematics device 115 also may be configured to detect or determine additional types of data relating to real-time driving and the condition of the vehicle 110. The telematics device 115 may store the type of vehicle 110, for example, as well as the make, model, trim (or sub-model), year, and/or engine specifications, and autonomous driving system specifications. Additionally, other information such as vehicle owner or driver information, insurance information, and financing information for the vehicle 110 may be stored on telematics device 115.

In some instances, telematics device 115 may be configured to receive data from vehicle sensors 111 and cameras and proximity sensors 112 and to transfer the received data to external computing systems including vehicles 110a-n, mobile device 117, historical data source server 120, third party data source server 130, multi-dimensional near short term risk score generation server 140, and near short term risk map generation server 150. In other instances, vehicle sensors 111 and cameras and proximity sensors 112 may be configured to directly transmit data to external computing systems (e.g., vehicles 110a-n, mobile device 117, historical data source server 120, third party data source server 130, multi-dimensional near short term risk score generation server 140, and near short term risk map generation server 150) without using the telematics device. Thus, telematics device 115 may be optional in certain embodiments.

Vehicle control computer 116 may contain some or all of the hardware/software components as the computing device 601 depicted in FIG. 6, and may be configured to operate aspects of the driving, or other operation of vehicle 110, including but not limited to, acceleration, braking, steering, and/or route navigation. Furthermore, vehicle control computer 116 may be configured to operate one or more internal vehicle systems and/or components including at least a vehicle sound system, dashboard display and/or heads-up display system, interior lighting system, climate control system, door locking systems, and the like. Similarly, vehicle control computer 116 may be configured to operate one or more external vehicle systems and/or components including windshield wipers, exterior lighting systems (e.g., headlights, tail lights, running lights, turn signals, emergency lights, etc.), emission and exhaust systems, fuel systems, suspension systems, transmission systems, and the like.

In order to perform the various close call detection functions described herein, vehicle control computer 116 may be configured to receive, analyze, and act upon vehicle performance and operational data provided by vehicle sensors 111 and environmental conditions and surroundings data provided by cameras and proximity sensors 112. Additionally, vehicle control computer 116 may be configured to receive, analyze, and act upon data provided by vehicles 110a-n, historical data source server 120, third party data source server 130, multi-dimensional near short term risk score generation server 140, and near short term risk map generation server 150. Such data may be received through short-range communication systems 113 and/or other on-board communication systems. In certain Embodiments, vehicle control computer 116 may also be configured to receive, analyze, and act upon data provided by telematics device 115 and mobile device 117. Such data may be used by vehicle control computer 116 to perform autonomous driving functions, semi-autonomous driving functions, and/or provide any of the close call detection alerts described herein for vehicle 110 and occupants therein.

In certain embodiments, mobile computing device 117 may be included within the vehicle 110 and may be used to independently collect vehicle driving data and/or to receive vehicle driving data from one or more vehicle systems. Mobile computing device 117 may be, for example, a mobile phone, personal digital assistant (PDA), or tablet computer of the driver or passenger(s) of vehicle 110. Software applications executing on mobile device 117 may be configured to independently detect certain driving data. For example, mobile device 117 may be equipped with one or more accelerometers and/or GPS systems (e.g., sensors 118) which may be accessed by software applications executing on mobile device 117 to determine vehicle location, speed, direction, and other basic driving data. As stated above, mobile computing device 117 may be configured to transmit the independently collected vehicle driving data and/or the received vehicle driving data and environmental conditions data to one or more external computing devices.

In other examples, software on the mobile device 117 may be configured to receive some or all of the driving data collected by vehicle sensors 111 and cameras and/or proximity sensors 112. Mobile computing device 117 may also be involved with aspects of autonomous and semi-autonomous driving, including receiving, collecting, and transmitting vehicle operational data regarding autonomous and semi-autonomous driving and autonomous and semi-autonomous driving relationships between multiple vehicles. Furthermore, mobile device 117 may be configured to perform the multi-dimensional risk score calculations described in further detail below.

The close call detection system 100 may include a historical data source server 120, containing some or all of the hardware/software components as the computing device 601 depicted in FIG. 6. Historical data source 120 may comprise a historical data source computer 121 for receiving and/or processing historical data including insurance claims, accident reports, historical environmental surroundings and conditions and/or historical vehicle operations data and ancillary data associated with insurance claims and accident reports. The historical data source server 120 may also comprise a database 122 used to store the historical data collected by the historical data source computer 121. The historical data source computer 121 may transmit the historical data to vehicle 110 for aiding in the performance of the close call detection alerts as described herein.

The system 100 may include a third party data source server 130, containing some or all of the hardware/software components as the computing device 601 depicted in FIG. 6. Third party data source server 130 may comprise a third party data source computer 131 for receiving and/or processing third party data including current weather condition data, forecasted weather condition data, traffic flow data, road closure data, and/or other data affecting external driving conditions. The third party data source server 130 may also comprise a database 132 used to store the third party data collected by the third party data source computer 131. The third party data source computer 131 may transmit the historical data to the vehicle 110 for aiding in the performance of the close call detection alerts as described herein.

The close call detection system 100 may include a multi-dimensional near short term risk score generation server 140 (e.g., risk score generation server 140), containing some or all of the hardware/software components as the computing device 601 depicted in FIG. 6. The multi-dimensional near short term risk score generation server 140 may include hardware, software, and network components to receive data from one or more data sources, such as the vehicle 110 (e.g., via short-range communication systems 113, telematics device 115, vehicle control computer 116, etc.), one or more additional vehicles 110a-n, mobile computing device 117, historical data source 120, third party data source 130, risk map generation server 150, and other data sources. The multi-dimensional near short term risk score generation server 140 may include a database 142, which may include additional data for the multi-dimensional near short term risk score generation server 140 to process to, for example, generate one or more multi-dimensional near short term risk scores. The multi-dimensional near short term risk score generation computer 141 may analyze data received from the various data sources. The multi-dimensional near short term risk score generation server 140 may initiate communication with and/or retrieve data from the vehicle 110, one or more additional vehicles 110a-n, mobile computing device 114, historical data source 120, third party data source 130, risk map generation server 150, and other data sources wirelessly, or by way of separate computing systems over one or more computer networks (e.g., the Internet). In some instances, vehicle control computer 116 may include a multi-dimensional near short term risk score module 119 which may include a similar ability to generate one or more multi-dimensional near short term risk scores as compared to multi-dimensional risk score server 140.

Multi-dimensional near short term risk scores may be determined for one or more of the data values determined by the vehicle sensors 111, cameras and/or proximity sensors 112, telematics device 115, mobile computing device 117, historical data source server 120, third party data source server 130, and the like. For example, multi-dimensional near short term risk scores may be determined for one or more of the vehicle performance and/or operational data variables including vehicle speed, acceleration, breaking, and the like, one or more of the internal vehicle systems data variables including turn signal usage, hazard light usage, windshield wiper usage, and the like, one or more of the environmental conditions data variables including precipitation levels, precipitation types, ambient light levels, and the like, and so on (e.g., vehicle operation data and ancillary data). Additionally, multi-dimensional near short term risk scores may be determined for vehicle performance and/or operational data received from one or more additional vehicle 110a-n.

The calculation of the multi-dimensional near short term risk scores may be performed by the multi-dimensional near short term risk score generation server 140 and/or the multi-dimensional near short term risk score module 119. In calculating the multi-dimensional near short term risk scores, the multi-dimensional near short term risk score generation server 140 and/or the multi-dimensional near short term risk score module 119 may incorporate data provided by the historical data source server 120. In some examples, multi-dimensional near short term risk scores determined for each variable may be summed to determine an overall multi-dimensional near short term risk score. The multi-dimensional near short term risk score may be a number from 0 to 100 wherein 0 represents minimal risk and 100 represents maximum risk. Furthermore, the multi-dimensional near short term risk scores may be calculated seamlessly and in real-time based on changes in the vehicle performance and/or operational data, environmental conditions data, traffic data, route data, and the like as described above. The multi-dimensional near short term risk scores may only be calculated for data having an impact in the near short term (e.g., 5 seconds to 5 minutes).

In some arrangements, additional risk score aspects may be used to evaluate near short term adverse situations, associated risk, and the like. For instance, arrangements described U.S. patent application Ser. No. 15/182,955 entitled, "DATA PROCESSING SYSTEM COMMUNICATING WITH A MAP DATA PROCESSING SYSTEM TO DETERMINE OR ALTER A NAVIGATION PATH BASED ON ONE OR MORE ROAD SEGMENTS" filed on Jun. 15, 2016, which is incorporated herein by reference, may be used in conjunction with aspects described in the present disclosure to do generate one or more risk scores based on various factors indicating a nature of an event.

The system 100 may include a risk map generation server 150, containing some or all of the hardware/software components as the computing device 601 depicted in FIG. 6. The risk map server 150 may include hardware, software, and network components to receive data from one or more data sources, such as the vehicle 110 (e.g., via short-range communication systems 113, telematics device 115, vehicle control computer 116, etc.), one or more additional vehicles 110a-n, mobile computing device 117, historical data source 120, third party data source 130, multi-dimensional risk score generation server 140, and other data sources. The risk map server 150 may include a database 152, which may include additional data for the risk map server 150 to process to, for example, generate one or more risk maps. The risk map computer 151 may analyze data received from the various data sources. The risk map server 150 may initiate communication with and/or retrieve data from the vehicle 110, one or more additional vehicles 110a-n, mobile computing device 114, historical data source 120, third party data source 130, risk map generation server 150, and other data sources wirelessly, or by way of separate computing systems over one or more computer networks (e.g., the Internet).

In some arrangements, the multi-dimensional near short term risk scores may be displayed on a near short term risk score map in the arrangements described in U.S. patent application Ser. No. 15/182,920 entitled, "DATA PROCESSING SYSTEM COMMUNICATING WITH A MAP DATA PROCESSING SYSTEM TO GENERATE A DISPLAY OF ONE OR MORE SEGMENTS OF ONE OR MORE VEHICLE ROUTES" filed on Jun. 15, 2016, which is incorporated herein by reference.

Vehicle control computer 116 may pull data, seamlessly and in real-time, from any one, or combination of, one or more additional vehicles 110a-n, vehicle sensors 111, cameras and proximity sensors 112, GPS 114, telematics device 115, mobile device 117, historical data source server 120, third party data source server 130, multi-dimensional near short term risk score generation server 140, and/or near short term risk map generation server 150. The data provided may enable vehicle control computer 116 to perform autonomous and semi-autonomous driving actions for vehicle 110, as well as to perform the close call detection alerts as described herein.

Figure 2:
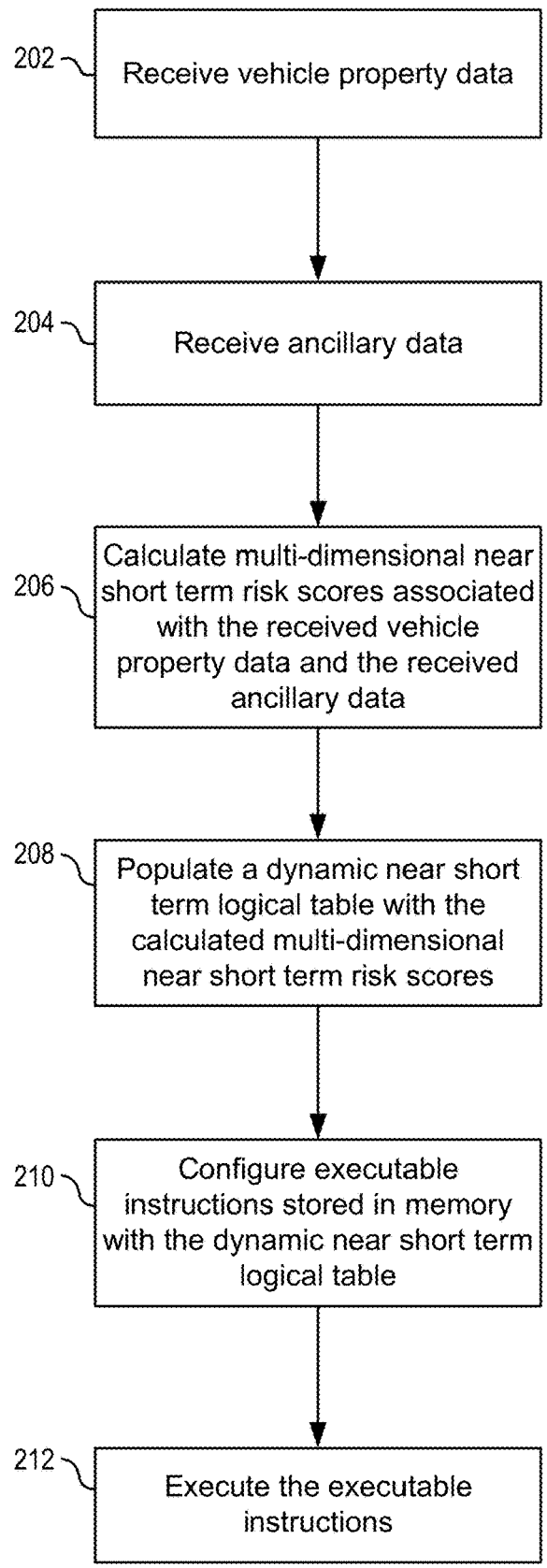
FIG. 2 is a flow diagram illustrating an example method of close call detection intervention measures according to one or more aspects of the disclosure.

FIG. 2 is a flow diagram illustrating an example method of close call detection intervention measures according to one or more aspects of the disclosure.

At step 202, vehicle control computer 116 may receive vehicle property data of a plurality of types associated with the vehicle 110 from a plurality of sources. For example, vehicle control computer 116 may receive vehicle performance and operational data for vehicle 110 from vehicle sensors 111. In some instances, vehicle control computer 116 may receive vehicle performance and operational data (e.g., location, speed, direction acceleration, deceleration, and the like) from one or more sensors 118 included in mobile computing device 117. The received vehicle performance and operational data may be associated with the general operation of vehicle 110. For example, the received vehicle performance and operational data may include at least the vehicle's speed, rates of acceleration or deceleration (e.g., braking), steering column positioning, headlights usage, brake light operation, door opening and closing, door locking and unlocking, cruise control usage, hazard lights usage, windshield wiper usage, horn usage, and turn signal usage. Other types of vehicle performance and operational data may be received including at least suspension positioning information, level of fuel in the fuel tank, engine revolutions per minute (RPMs), engine status, oil level, engine coolant temperature, odometer reading, and/or tire pressure. In some instances, telematics device 115 may provide the vehicle control computer 116 with vehicle make, model, and parts information. Alternatively, such information may be pre-stored in memory associated with vehicle control computer 116. The vehicle performance and operational data may be transmitted by the vehicle sensors 111 to the vehicle control computer continuously and in real-time.

Additionally, vehicle control computer 116 may receive internal vehicle conditions data for vehicle 110 from vehicle sensors 111 and/or cameras and proximity sensors 112. The received internal vehicle conditions data may include at least the number of passengers in the vehicle, seat belt usage indications for each of the passengers in the vehicle, and internal decibel levels. In some instances, a mobile device 117 associated with a driver of the vehicle may provide a usage indication to vehicle control computer 116. The usage indication provided may be a general usage indication corresponding to unspecified mobile device activity, or may be a specific usage indication corresponding to specific mobile device activity (e.g., usage of text messaging, camera, internet browser, and/or usage of social media applications). The internal vehicle conditions data and mobile device usage indication data may be provided to the vehicle control computer 116 continuously and in real-time by vehicle sensors 111, cameras and proximity sensors 112, and mobile device 117.

Furthermore, vehicle control computer 116 may receive route data associated with vehicle 110 from an on-board navigation system and/or a navigation application operating on mobile computing device 117. The received route data may include a final destination for vehicle 110 and route information corresponding to the suggested route to arrive most efficiently at the final destination suggested by the navigation system and/or navigation application. Additionally, vehicle control computer 116 may receive location information associated with vehicle 110 from on-board GPS 114 and/or sensor 118 (e.g., GPS) from mobile computing device 118. The route and location data may be received by vehicle control computer 116 continuously and in real-time.

At step 204, vehicle control computer 116 may receive ancillary data of any of a plurality of types associated with the surroundings of vehicle 110 from any of a plurality of sources. For example, vehicle computer 116 may receive vehicle performance and operational data and internal vehicle conditions data, as described above in step 202, from the short-range communication systems of one or more additional vehicles 110a-n. The vehicle control computer 116 may output a polling request via short-range communication systems 113 for the vehicle performance and operational data and internal vehicle conditions data from the one or more additional vehicles 110a-n. The polling request may be output within a certain radial proximity from vehicle 110 (e.g., 5 feet, 100 feet, 500 feet, 1 mile, etc.). In some instances, vehicle make, model, and part data, as well as route data may also be requested from the one or more additional vehicles 110a-n. The vehicle performance and operational data and internal vehicle conditions data for the one or more additional vehicles 110a-n may be received by vehicle control computer 116 continuously and in real-time.

Additionally, ancillary data associated with the surroundings of vehicle 110 may include environmental conditions data provided by any one, or combination of, vehicle sensors 111, cameras and proximity sensors 112, mobile device 117, and/or third party data source server 130. In particular, vehicle sensors 111 and cameras and proximity sensors 112 may provide vehicle control computer 116 with environmental conditions data corresponding to the weather conditions as immediately experienced by vehicle 110. Such immediately experienced environmental conditions data may include an indication of precipitation, type of precipitation, volume of precipitation, temperature, presence of road ice, presence of fluid on road, ambient light levels, presence of fog, density of fog, sun position affecting driver visibility, presence of wind and/or wind gusts, velocity of wind and/or wind gusts, and the like. Mobile device 117 and/or third party data source server 130, on the other hand, may provide vehicle control computer 116 with expected and/or forecasted weather data associated with the area corresponding to a location of vehicle 110. Such forecasted weather data may include a likelihood of precipitation, wind, road ice, fog, and the like. The environmental conditions data, as determined by sensors 111, cameras and proximity sensors 112, mobile device 117, and/or third party data source server 130, may be provided to vehicle control computer 116 continuously and in real-time.

Furthermore, the ancillary data associated with the surroundings of vehicle 110 may include traffic data provided by any one, or combination of, vehicle sensors 111, cameras and proximity sensors 112, mobile device 117 (e.g., sensors 118 within the mobile device), a navigation system associated with vehicle control computer 116, and/or third party data source server 130. In particular, vehicle sensors 111 and cameras and proximity sensors 112 may traffic data to vehicle control computer 116 as immediately experienced by vehicle 110 in the area surrounding vehicle 110. The mobile device 117, via a navigation application, the on-board navigation system of vehicle control computer 116, and the third party data source server 130 may provide the vehicle control computer with traffic data associated with the projected route of vehicle 110. Such traffic data may be provided to vehicle control computer 110 continuously and in real-time.

Also, the ancillary data may include road type and quality data, which may be provided by vehicle sensors 111 and/or cameras and proximity sensors 112. In some instances, road type and quality data may be provided by a navigation application operating on mobile device 117 (e.g., crowd sourced navigation application). Road type and road quality data may be provided to vehicle control computer 110 continuously and in real-time.

In some instances steps 202 and 204 may be performed sequentially. In other instances, steps 202 and 204 may be performed simultaneously.

At step 206, through the utilization of multivariable close call detection algorithms, the multi-dimensional near short term risk score module 119 may be configured to calculate a risk score associated with the vehicle property data and the ancillary data based upon historical data provided by historical data source server 120. For instance, multi-dimensional near short term risk score module 119 may be configured to process and/or analyze the vehicle property data (e.g., vehicle performance and operational data, internal vehicle conditions, and vehicle route data for vehicle 110) in tandem with the ancillary data (e.g., vehicle performance and operational data, internal vehicle conditions data, and vehicle route data for one or more additional vehicles 110a-n, environmental conditions data, traffic data, and road type and road quality data) based on historical data (e.g., claims data, accident data, etc.) to determine a risk score associated with each of the variables within the vehicle property data and the ancillary data (e.g., vehicle velocity, velocity of additional vehicles 110a-n, vehicle acceleration, acceleration of additional vehicles 110a-n, vehicle cruise control usage, vehicle hazard lights usage, vehicle windshield wiper usage, vehicle horn usage, vehicle indication of precipitation, vehicle type of precipitation, vehicle volume of precipitation, temperature, vehicle presence of road ice and/or moisture, etc.). In some instances, multi-dimensional near short term risk score module 119 may perform such calculations alone, or in tandem with multi-dimensional near short term risk score generation server 140. For example, depending on the complexity of the multivariable close call detection equations and processing power necessary to solve such equations, multi-dimensional near short term risk score generation server 140 may aid multi-dimensional near short term risk score module 119 in generating solutions and/or generating complete solutions. The risk score calculations may be performed continuously and in real-time.

In some instances, aspects of the above-noted multi-dimensional near short term risk score calculations may be performed by mobile computing device 117 in conjunction with one or more other devices. However, in other instances, mobile computing device 117 may be configured to receive the vehicle operational data and auxiliary data and may be configured to perform the multi-dimensional near short term risk score calculations independently from multi-dimensional near short term risk score module 119 and/or multi-dimensional near short term risk score generation server 140.

At step 208, the vehicle control computer 116 may populate a dynamic near short term logical table with the calculated risk scores for the received vehicle property data and the received ancillary data. The near short term logical table may be dynamically updated and/or refreshed respective to changes occurring in the continuous and real-time monitoring of the vehicle property data and the ancillary data and subsequent calculations of the risk scores associated with the changes to the vehicle property data and the ancillary data. In other words, the vehicle control computer 116 may populate the dynamic near short term logical table with the risk scores of the vehicle property data and ancillary data and may update, refresh, and/or repopulate the near short term logical table continuously and in real-time based on dynamic changes to the risk values associated with changes in the vehicle property data and ancillary data. At step 210, the vehicle control computer 116 may configure executable instructions stored in memory with the dynamic near short term logical table.

At step 212, one or more processors associated with the vehicle control computer 116 may execute the executable instructions, which may cause the vehicle control computer 116 to take any of a plurality of close call detection actions and/or cause any of a plurality of close call detection alerts to occur in order to alter the state of the vehicle property data and/or ancillary data and thereby lessen the risk level associated with the vehicle property data and/or the ancillary data. Close call detection actions may include any one, or combination of, activating the brake, changing lanes, disabling mobile phone 117, disabling application use on mobile phone 117, disabling acceleration, reducing speed, turning on headlights, turning on emergency lights, honking vehicle horn, turning on windshield wipers, and the like. Close call alerts may include any one, or combination of, flashing interior lights, producing an audible sound in the interior of vehicle 110, suggesting an alternate route, providing an indication of upcoming issues on the dashboard and/or heads-up display unit, and the like.

For example, vehicle 110 may be traveling at 65 mph on a 4-lane, serpentine highway in moderate traffic. The cameras and proximity sensors 112 may detect the presence of precipitation (e.g., rain) at a heavy rate and one or more passengers inside vehicle 110 without a seat belt. Responsive to such data, multi-dimensional risk score module 119 may indicate a high risk level associated with the vehicle operation data (e.g., velocity of 65 mph, one or more passengers without seatbelts) and ancillary data (e.g., 4 lane serpentine highway, moderate traffic, heavy rainfall). Accordingly, vehicle control computer 116 may cause vehicle 110 to reduce velocity to 30 mph and turn on vehicle headlights and emergency lights (e.g., take close call detection actions) and provide both an audio indication over vehicle speaker systems and visual indication on the dashboard for the one or more passengers not using seatbelts to fasten seatbelts (e.g., cause close detection alerts).

In some examples, the result change of the vehicle operational data and ancillary data responsive to the close call detection actions and/or close call detection alerts may be reported to one or more remote computing devices (e.g., fleet server system, home computer, work server system, insurance server systems, etc.) for later review. Such result change reports may be reviewed by a driver at a later time in which the driver is not operating vehicle 110 in order to study driver behavior and responses and provide strategies for improvement.

Figure 3:
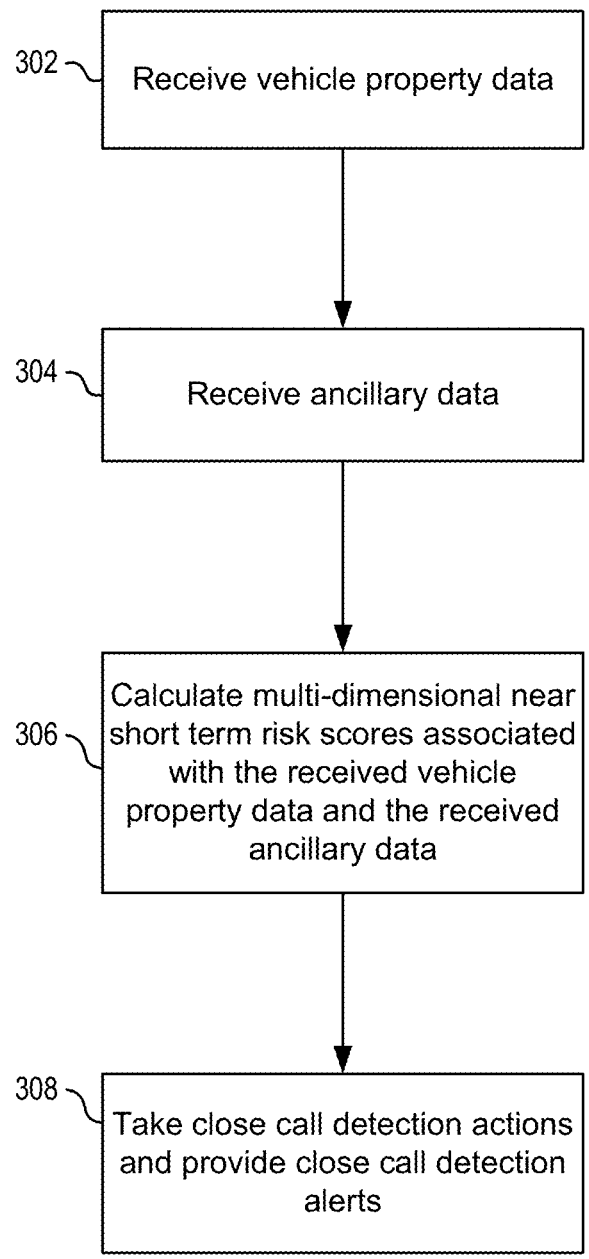
FIG. 3 is a flow diagram illustrating another example method of close call detection intervention measures according to one or more aspects of the disclosure.

FIG. 3 is a flow diagram illustrating another example method of close call detection intervention measures according to one or more aspects of the disclosure.

At step 302, vehicle control computer 116 may receive vehicle property data of plurality of types associated with the vehicle 110 from a plurality of sources. For example, vehicle control computer 116 may receive vehicle performance and operational data for vehicle 110 from vehicle sensors 111. In some instances, vehicle control computer 116 may receive vehicle performance and operational data (e.g., location, speed, direction acceleration, deceleration, and the like) from one or more sensors 118 included in mobile computing device 117. The received vehicle performance and operational data may be associated with the general operation of vehicle 110. For example, the received vehicle performance and operational data may include at least the vehicle's speed, rates of acceleration or deceleration (e.g., braking), steering column positioning, headlights usage, brake light operation, door opening and closing, door locking and unlocking, cruise control usage, hazard lights usage, windshield wiper usage, horn usage, and turn signal usage. Other types of vehicle performance and operational data may be received including at least suspension positioning information, level of fuel in the fuel tank, engine revolutions per minute (RPMs), engine status, oil level, engine coolant temperature, odometer reading, and/or tire pressure. In some instances, telematics device 115 may provide the vehicle control computer 116 with vehicle make, model, and parts information. Alternatively, such information may be pre-stored in memory associated with vehicle control computer 116. The vehicle performance and operational data may be transmitted by the vehicle sensors 111 to the vehicle control computer continuously and in real-time.

Additionally, vehicle control computer 116 may receive internal vehicle conditions data for vehicle 110 from vehicle sensors 111 and/or cameras and proximity sensors 112. The received internal vehicle conditions data may include at least the number of passengers in the vehicle, seat belt usage indications for each of the passengers in the vehicle, and internal decibel levels. In some instances, a mobile device 117 associated with a driver of the vehicle may provide a usage indication to vehicle control computer 116. The usage indication provided may be a general usage indication corresponding to unspecified mobile device activity, or may be a specific usage indication corresponding to specific mobile device activity (e.g., usage of text messaging, camera, internet browser, and/or usage of social media applications). The internal vehicle conditions data and mobile device usage indication data may be provided to the vehicle control computer 116 continuously and in real-time by vehicle sensors 111, cameras and proximity sensors 112, and mobile device 117.

Furthermore, vehicle control computer 116 may receive route data associated with vehicle 110 from an on-board navigation system and/or a navigation application operating on mobile computing device 117. The received route data may include a final destination for vehicle 110 and route information corresponding to the suggested route to arrive most efficiently at the final destination suggested by the navigation system and/or navigation application. Additionally, vehicle control computer 116 may receive location information associated with vehicle 110 from on-board GPS 114 and/or sensor 118 (e.g., GPS) from mobile computing device 118. The route and location data may be received by vehicle control computer 116 continuously and in real-time.

At step 304, vehicle control computer 116 may receive ancillary data of any of a plurality of types associated with the surroundings of vehicle 110 from any of a plurality of sources. For example, vehicle computer 116 may receive vehicle performance and operational data and internal vehicle conditions data, as described above in step 302, from the short-range communication systems of one or more additional vehicles 110*a-n*. The vehicle control computer 116 may output a polling request via short-range communication systems 113 for the vehicle performance and operational data and internal vehicle conditions data from the one or more additional vehicles 110*a-n*. The polling request may be output within a certain radial proximity from vehicle 110 (e.g., 5 feet, 100 feet, 500 feet, 1 mile, etc.). In some instances, vehicle make, model, and part data, as well as route data may also be requested from the one or more additional vehicles 110*a-n*. The vehicle performance and operational data and internal vehicle conditions data for the one or more additional vehicles 110*a-n* may be received by vehicle control computer 116 continuously and in real-time.

Additionally, ancillary data associated with the surroundings of vehicle 110 may include environmental conditions data provided by any one, or combination of, vehicle sensors 111, cameras and proximity sensors 112, mobile device 117, and/or third party data source server 130. In particular, vehicle sensors 111 and cameras and proximity sensors 112 may provide vehicle control computer 116 with environmental conditions data corresponding to the weather conditions as immediately experienced by vehicle 110. Such immediately experienced environmental conditions data may include an indication of precipitation, type of precipitation, volume of precipitation, temperature, presence of road ice, presence of fluid on road, ambient light levels, presence of fog, density of fog, sun position affecting driver visibility, presence of wind and/or wind gusts, velocity of wind and/or wind gusts, and the like. Mobile device 117 and/or third party data source server 130, on the other hand, may provide vehicle control computer 116 with expected and/or forecasted weather data associated with the area corresponding to a location of vehicle 110. Such forecasted weather data may include a likelihood of precipitation, wind, road ice, fog, and the like. The environmental conditions data, as determined by sensors 111, cameras and proximity sensors 112, mobile device 117, and/or third party data source server 130, may be provided to vehicle control computer 116 continuously and in real-time.

Furthermore, the ancillary data associated with the surroundings of vehicle 110 may include traffic data provided by any one, or combination of, vehicle sensors 111, cameras and proximity sensors 112, mobile device 117 (e.g., sensors 118 within the mobile device), a navigation system associated with vehicle control computer 116, and/or third party data source server 130. In particular, vehicle sensors 111 and cameras and proximity sensors 112 may traffic data to vehicle control computer 116 as immediately experienced by vehicle 110 in the area surrounding vehicle 110. The mobile device 117, via a navigation application, the on-board navigation system of vehicle control computer 116, and the third party data source server 130 may provide the vehicle control computer with traffic data associated with the projected route of vehicle 110. Such traffic data may be provided to vehicle control computer 110 continuously and in real-time.

Also, the ancillary data may include road type and quality data, which may be provided by vehicle sensors 111 and/or cameras and proximity sensors 112. In some instances, road type and quality data may be provided by a navigation application operating on mobile device 117. Road type and road quality data may be provided to vehicle control computer 110 continuously and in real-time.

In some instances steps 302 and 304 may be performed sequentially. In other instances, steps 302 and 304 may be performed simultaneously.

At step 306, through the utilization of multivariable close call detection algorithms, the multi-dimensional risk near short term score module 119 may be configured to calculate a risk score associated with the vehicle property data and the ancillary data based upon historical data provided by historical data source server 120. For instance, multi-dimensional near short term risk score module 119 may be configured to process and/or analyze the vehicle property data (e.g., vehicle performance and operational data, internal vehicle conditions, and vehicle route data for vehicle 110) in tandem with the ancillary data (e.g., vehicle performance and operational data, internal vehicle conditions data, and vehicle route data for one or more additional vehicles 110*a-n*, environmental conditions data, traffic data, and road type and road quality data) based on historical data (e.g., claims data, accident data, etc.) to determine a risk score associated with each of the variables within the vehicle property data and the ancillary data (e.g., vehicle velocity, velocity of additional vehicles 110a-n, vehicle acceleration, acceleration of additional vehicles 110a-n, vehicle cruise control usage, vehicle hazard lights usage, vehicle windshield wiper usage, vehicle horn usage, vehicle indication of precipitation, vehicle type of precipitation, vehicle volume of precipitation, temperature, vehicle presence of road ice and/or moisture, etc.). In some instances, multi-dimensional risk score module 119 may perform such calculations alone, or in tandem with multi-dimensional near short term risk score generation server 140. For example, depending on the complexity of the multivariable close call detection equations and processing power necessary to solve such equations, multi-dimensional near short term risk score generation server 140 may aid multi-dimensional near short term risk score module 119 in generating solutions and/or generating complete solutions. The risk score calculations may be performed continuously and in real-time.

In some instances, aspects of the above-noted multi-dimensional near short term risk score calculations may be performed by mobile computing device 117 in conjunction with one or more other devices. However, in other instances, mobile computing device 117 may be configured to receive the vehicle operational data and auxiliary data and may be configured to perform the multi-dimensional near short term risk score calculations independently from multi-dimensional near short term risk score module 119 and/or multi-dimensional near short term risk score generation server 140.

At step 308, the vehicle control computer 116 may take any of a plurality of close call detection actions and/or provide any of a plurality of close call detection alerts in order to alter the state of the vehicle property data and/or ancillary data and thereby lessen the risk level associated with the vehicle property data and/or the ancillary data. Close call detection actions may include any one, or combination of, activating the break, changing lanes, disabling mobile phone 117, disabling application use on mobile phone 117, disabling acceleration, reducing speed, turning on headlights, turning on emergency lights, honking vehicle horn, turning on windshield wipers, and the like. Close call alerts may include any one, or combination of, flashing interior lights, producing an audible sound in the interior of vehicle 110, suggesting an alternate route, providing an indication of upcoming issues on the dashboard and/or heads-up display unit, and the like.

For example, vehicle 110 may be traveling at 45 mph on a 2-lane river road with no traffic. The cameras and proximity sensors 112, mobile device 117, and third party data source server 130 may indicate thick fog in vehicle's 110 ambient environment. Mobile device 117 may further indicate active usage of a social media application and third party data source server 130 may further indicate a severe accident 5 miles down the 2-lane river road. Responsive to such data, multi-dimensional risk score module 119, in conjunction with risk score generation server 140, may indicate a moderate risk level associated with the vehicle operation data (e.g., velocity of 45 mph, active usage of applications on mobile device 117) and ancillary data (e.g., 2-lane river road, no traffic, thick fog). Accordingly, vehicle control computer 116 may cause vehicle 110 to temporarily disable the usage of active use applications on mobile device 117 (e.g., take close call detection action) and visual indication on a heads-up display that an accident has been documented 5 miles ahead (e.g., cause close detection alerts).

In some examples, the vehicle control computer 116 may include a backend access channel through which a parent, manager, fleet operation, or the like may respond to one or more close call detection alerts provided by vehicle control computer 116. For example, responsive to vehicle control computer 116 flashing interior cabin lights to alert a driver of vehicle 110 to upcoming traffic, a fleet operation may respond to the alert and prevent the vehicle 110 from surpassing a certain velocity until the upcoming traffic has subsided.

Figure 4:
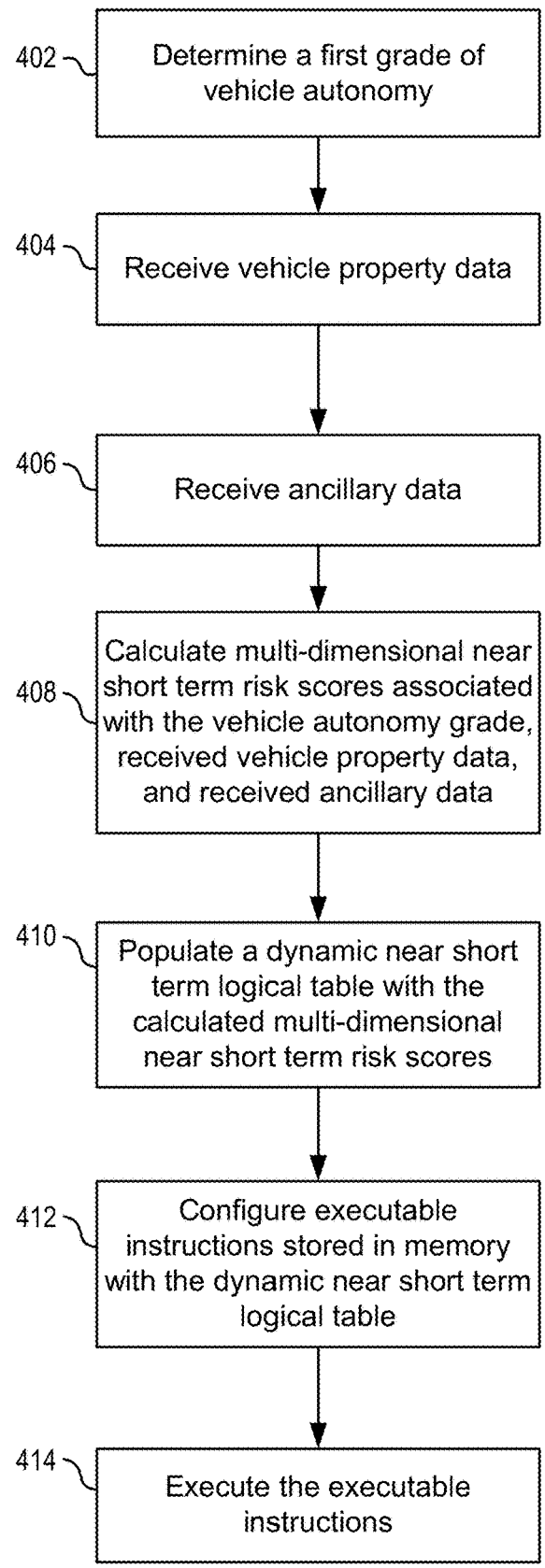
FIG. 4 is a flow diagram illustrating an example method of close call detection intervention measures for a vehicle of a known autonomous level according to one or more aspects of the disclosure.

FIG. 4 is a flow diagram illustrating an example method of close call detection intervention measures for a vehicle of a known autonomous level according to one or more aspects of the disclosure.

At step 402, vehicle control computer 116 may determine an active grade and/or first grade of autonomy of vehicle 110 corresponding to one of a plurality of levels of vehicle autonomy. In some instances, mobile device 117 may determine the active grade and/or first grade of autonomy of vehicle 110. For instance, the vehicle control computer 116 and/or mobile device 117 may determine a first grade or level of autonomy corresponding to one of five grades of vehicle autonomy as described by the United States Department of Transportation. The five levels of vehicle autonomy may start at level 0 and conclude at level 4. Level 0 may correspond to no vehicle automation and full driver control of primary vehicle controls (e.g., braking, steering, acceleration, etc.) at all times. Level 1 may correspond to vehicle autonomy with respect to one or more specific control functions (e.g., stability control, anti-lock braking, etc.) and wherein the vehicle assists a driver with at least one of such control functions (e.g., braking). Level 2 may correspond to vehicle autonomy with respect to two or more specific control functions (e.g., stability control, anti-lock braking, cruise control, lane centering, etc.) and wherein the vehicle assists a driver with two or more control functions (e.g., cruise control and lane centering). Level 3 may correspond to vehicle control systems operating all safety-critical functions under certain traffic conditions after which the driver is expected to take control of the vehicle. Level 4 may correspond to vehicle control systems operating all driving functions for an entire vehicle trip and for the driver of the vehicle to provide navigation input, but not take driving control at any time during the trip.

At step 404, vehicle control computer 116 may receive vehicle property data of a plurality of types associated with the vehicle 110 from a plurality of sources. For example, vehicle control computer 116 may receive vehicle performance and operational data for vehicle 110 from vehicle sensors 111. In some instances, vehicle control computer 116 may receive vehicle performance and operational data (e.g., location, speed, direction acceleration, deceleration, and the like) from one or more sensors 118 included in mobile computing device 117. The received vehicle performance and operational data may be associated with the general operation of vehicle 110. For example, the received vehicle performance and operational data may include at least the vehicle's speed, rates of acceleration or deceleration (e.g., braking), steering column positioning, headlights usage, brake light operation, door opening and closing, door locking and unlocking, cruise control usage, hazard lights usage, windshield wiper usage, horn usage, and turn signal usage. Other types of vehicle performance and operational data may be received including at least suspension positioning information, level of fuel in the fuel tank, engine revolutions per minute (RPMs), engine status, oil level, engine coolant temperature, odometer reading, and/or tire pressure. In some instances, telematics device 115 may provide the vehicle control computer 116 with vehicle make, model, and parts information. Alternatively, such information may be pre-stored in memory associated with vehicle control computer 116. The vehicle performance and operational data may be transmitted by the vehicle sensors 111 to the vehicle control computer continuously and in real-time.

Additionally, vehicle control computer 116 may receive internal vehicle conditions data for vehicle 110 from vehicle sensors 111 and/or cameras and proximity sensors 112. The received internal vehicle conditions data may include at least the number of passengers in the vehicle, seat belt usage indications for each of the passengers in the vehicle, and internal decibel levels. In some instances, a mobile device 117 associated with a driver of the vehicle may provide a usage indication to vehicle control computer 116. The usage indication provided may be a general usage indication corresponding to unspecified mobile device activity, or may be a specific usage indication corresponding to specific mobile device activity (e.g., usage of text messaging, camera, internet browser, and/or usage of social media applications). The internal vehicle conditions data and mobile device usage indication data may be provided to the vehicle control computer 116 continuously and in real-time by vehicle sensors 111, cameras and proximity sensors 112, and mobile device 117.

Furthermore, vehicle control computer 116 may receive route data associated with vehicle 110 from an on-board navigation system and/or a navigation application operating on mobile computing device 117. The received route data may include a final destination for vehicle 110 and route information corresponding to the suggested route to arrive most efficiently at the final destination suggested by the navigation system and/or navigation application. Additionally, vehicle control computer 116 may receive location information associated with vehicle 110 from on-board GPS 114 and/or sensor 118 (e.g., GPS) from mobile computing device 118. The route and location data may be received by vehicle control computer 116 continuously and in real-time.

At step 406, vehicle control computer 116 may receive ancillary data of any of a plurality of types associated with the surroundings of vehicle 110 from any of a plurality of sources. For example, vehicle computer 116 may receive vehicle performance and operational data and internal vehicle conditions data, as described above in step 404, from the short-range communication systems of one or more additional vehicles 110a-n. The vehicle control computer 116 may output a polling request via short-range communication systems 113 for the vehicle performance and operational data and internal vehicle conditions data from the one or more additional vehicles 110a-n. The polling request may be output within a certain radial proximity from vehicle 110 (e.g., 5 feet, 100 feet, 500 feet, 1 mile, etc.). In some instances, vehicle make, model, and part data, as well as route data may also be requested from the one or more additional vehicles 110a-n. The vehicle performance and operational data and internal vehicle conditions data for the one or more additional vehicles 110a-n may be received by vehicle control computer 116 continuously and in real-time.

Additionally, ancillary data associated with the surroundings of vehicle 110 may include environmental conditions data provided by any one, or combination of, vehicle sensors 111, cameras and proximity sensors 112, mobile device 117, and/or third party data source server 130. In particular, vehicle sensors 111 and cameras and proximity sensors 112 may provide vehicle control computer 116 with environmental conditions data corresponding to the weather conditions as immediately experienced by vehicle 110. Such immediately experienced environmental conditions data may include an indication of precipitation, type of precipitation, volume of precipitation, temperature, presence of road ice, presence of fluid on road, ambient light levels, presence of fog, density of fog, sun position affecting driver visibility, presence of wind and/or wind gusts, velocity of wind and/or wind gusts, and the like. Mobile device 117 and/or third party data source server 130, on the other hand, may provide vehicle control computer 116 with expected and/or forecasted weather data associated with the area corresponding to a location of vehicle 110. Such forecasted weather data may include a likelihood of precipitation, wind, road ice, fog, and the like. The environmental conditions data, as determined by sensors 111, cameras and proximity sensors 112, mobile device 117, and/or third party data source server 130, may be provided to vehicle control computer 116 continuously and in real-time.

Furthermore, the ancillary data associated with the surroundings of vehicle 110 may include traffic data provided by any one, or combination of, vehicle sensors 111, cameras and proximity sensors 112, mobile device 117, a navigation system associated with vehicle control computer 116, and/or third party data source server 130. In particular, vehicle sensors 111 and cameras and proximity sensors 112 may traffic data to vehicle control computer 116 as immediately experienced by vehicle 110 in the area surrounding vehicle 110. The mobile device 117, via a navigation application, the on-board navigation system of vehicle control computer 116, and the third party data source server 130 may provide the vehicle control computer with traffic data associated with the projected route of vehicle 110. Such traffic data may be provided to vehicle control computer 110 continuously and in real-time.

Also, the ancillary data may include road type and quality data, which may be provided by vehicle sensors 111 and/or cameras and proximity sensors 112. In some instances, road type and quality data may be provided by a navigation application operating on mobile device 117. Road type and road quality data may be provided to vehicle control computer 110 continuously and in real-time.

In some instances steps 402, 404, and 406 may be performed sequentially. In other instances, steps 402, 404, and 406 may be performed simultaneously.

At step 408, through the utilization of multivariable close call detection algorithms, the multi-dimensional near short term risk score module 119 may be configured to calculate a risk score associated with the vehicle property data and the ancillary data based upon historical data provided by historical data source server 120 corresponding to the vehicle autonomy level. For instance, multi-dimensional near short term risk score module 119 may be configured to process and/or analyze the vehicle property data (e.g., vehicle performance and operational data, internal vehicle conditions, and vehicle route data for vehicle 110) in tandem with the ancillary data (e.g., vehicle performance and operational data, internal vehicle conditions data, and vehicle route data for one or more additional vehicles 110a-n, environmental conditions data, traffic data, and road type and road quality data) based on historical data corresponding to the vehicle autonomy level (e.g., claims data, accident data, etc.) to determine a risk score associated with each of the variables within the vehicle property data and the ancillary data (e.g., vehicle velocity, velocity of additional vehicles 110a-n, vehicle acceleration, acceleration of additional vehicles 110a-n, vehicle cruise control usage, vehicle hazard lights usage, vehicle windshield wiper usage, vehicle horn usage, vehicle indication of precipitation, vehicle type of precipitation, vehicle volume of precipitation, temperature, vehicle presence of road ice and/or moisture, etc.). In some instances, multi-dimensional near short term risk score module 119 may perform such calculations alone, or in tandem with multi-dimensional near short term risk score generation server 140. For example, depending on the complexity of the multivariable close call detection equations and processing power necessary to solve such equations, multi-dimensional near short term risk score generation server 140 may aid multi-dimensional near short term risk score module 119 in generating solutions and/or generating complete solutions. The risk score calculations may be performed continuously and in real-time.

In some instances, aspects of the above-noted multi-dimensional near short term risk score calculations may be performed by mobile computing device 117 in conjunction with one or more other devices. However, in other instances, mobile computing device 117 may be configured to receive the vehicle operational data and auxiliary data and may be configured to perform the multi-dimensional near short term risk score calculations independently from multi-dimensional near short term risk score module 119 and/or multi-dimensional near short term risk score generation server 140.

At step 410, the vehicle control computer 116 may populate a dynamic near short term logical table with the calculated risk scores for the determined vehicle autonomy level, received vehicle property data, and the received ancillary data. The near short term logical table may be dynamically updated and/or refreshed respective to changes occurring in the continuous and real-time monitoring of the vehicle autonomy level, vehicle property data, and the ancillary data and subsequent calculations of the risk scores associated with the changes to the vehicle autonomy level, vehicle property data, and the ancillary data. At step 412, the vehicle control computer 116 may configure executable instructions stored in memory with the dynamic near short term logical table.

At step 414, one or more processors associated with the vehicle control computer 116 may execute the executable instructions, which may cause the vehicle control computer 116 to transfer the vehicle from the first grade of vehicle autonomy to a second grade of vehicle autonomy different than first grade in order to alter the state of the vehicle property data and/or ancillary data and thereby lessen the risk level associated with the vehicle autonomy level, vehicle property data, and/or the ancillary data. In some examples, the amount of grade change (e.g., level 3 to level 2, level 1 to level 4, etc.) may be pre-set and/or pre-programmed by a driver of vehicle 110. Additionally, the vehicle control computer 116 may provide an alert to a driver of vehicle 110 that a grade change will occur and/or is occurring and may provide an additional alert to one or more additional vehicles 110a-n via short-range communication systems 113.

For example, vehicle 110 may be determined to be at a grade 3 (e.g., level 3) of autonomous functioning. Vehicle 110 may be travelling at 5 mph on a 2-lane road in a residential neighborhood during a parade. Responsive to such data, multi-dimensional risk score module 119 may indicate an extremely high risk associated with the utilization of vehicle grade 4. Accordingly, vehicle control computer 116 may cause vehicle 110 to cease movement (e.g., take close call detection actions), provide both an audio indication over vehicle speaker systems and visual indication on the dashboard that a grade change is pending (e.g., cause close detection alerts), and changing the vehicle autonomy grade to 1.

Figure 5:
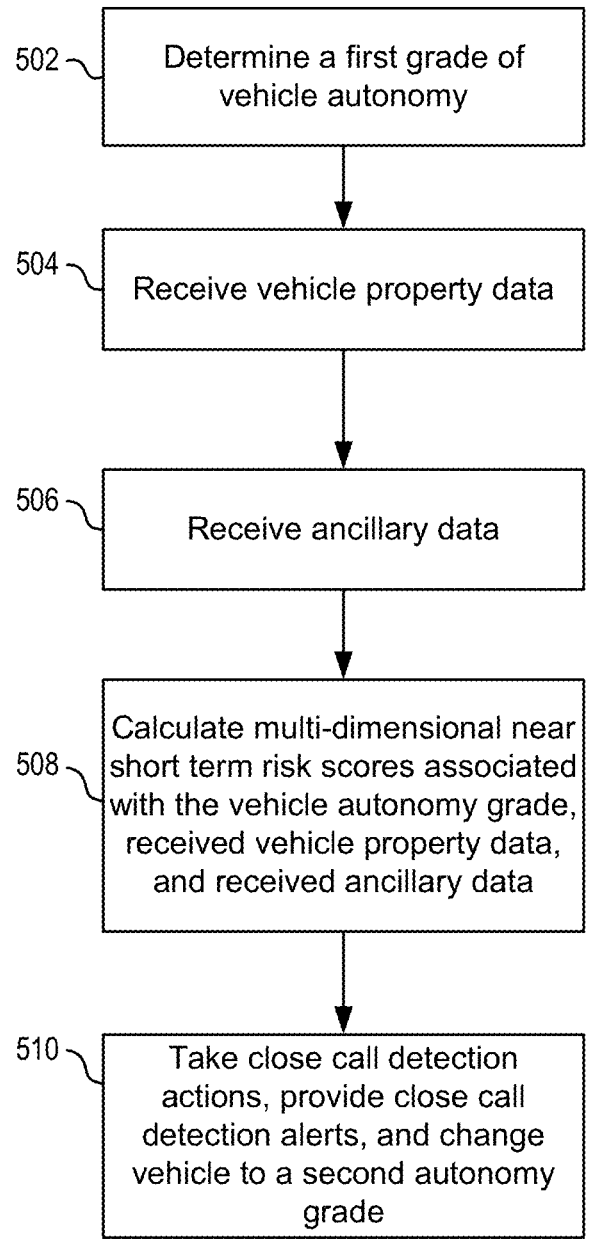
FIG. 5 is a flow diagram illustrating another example method of close call detection intervention measures for a vehicle of a known autonomous level according to one or more aspects of the disclosure.

FIG. 5 is a flow diagram illustrating an another example method of adverse driving event intervention measures taken by a vehicle responsive to the close call detection system indicating that an adverse driving event is probable within the near short term according to one or more aspects of the disclosure.

At step 502, vehicle control computer 116 may determine an active grade and/or first grade of autonomy of vehicle 110. In some instances, mobile device 117 may determine the active grade and/or first grade of autonomy of vehicle 110. For instance, the vehicle control computer 116 and/or the mobile device 117 may determine a first grade of autonomy corresponding to one of five levels of vehicle autonomy as described by the United States Department of Transportation, as described above with respect to FIG. 4.

At step 504, vehicle control computer 116 may receive vehicle property data of a plurality of types associated with the vehicle 110 from a plurality of sources. For example, vehicle control computer 116 may receive vehicle performance and operational data for vehicle 110 from vehicle sensors 111. In some instances, vehicle control computer 116 may receive vehicle performance and operational data (e.g., location, speed, direction acceleration, deceleration, and the like) from one or more sensors 118 included in mobile computing device 117. The received vehicle performance and operational data may be associated with the general operation of vehicle 110. For example, the received vehicle performance and operational data may include at least the vehicle's speed, rates of acceleration or deceleration (e.g., braking), steering column positioning, headlights usage, brake light operation, door opening and closing, door locking and unlocking, cruise control usage, hazard lights usage, windshield wiper usage, horn usage, and turn signal usage. Other types of vehicle performance and operational data may be received including at least suspension positioning information, level of fuel in the fuel tank, engine revolutions per minute (RPMs), engine status, oil level, engine coolant temperature, odometer reading, and/or tire pressure. In some instances, telematics device 115 may provide the vehicle control computer 116 with vehicle make, model, and parts information. Alternatively, such information may be pre-stored in memory associated with vehicle control computer 116. The vehicle performance and operational data may be transmitted by the vehicle sensors 111 to the vehicle control computer continuously and in real-time.

Additionally, vehicle control computer 116 may receive internal vehicle conditions data for vehicle 110 from vehicle sensors 111 and/or cameras and proximity sensors 112. The received internal vehicle conditions data may include at least the number of passengers in the vehicle, seat belt usage indications for each of the passengers in the vehicle, and internal decibel levels. In some instances, a mobile device 117 associated with a driver of the vehicle may provide a usage indication to vehicle control computer 116. The usage indication provided may be a general usage indication corresponding to unspecified mobile device activity, or may be a specific usage indication corresponding to specific mobile device activity (e.g., usage of text messaging, camera, internet browser, and/or usage of social media applications). The internal vehicle conditions data and mobile device usage indication data may be provided to the vehicle control computer 116 continuously and in real-time by vehicle sensors 111, cameras and proximity sensors 112, and mobile device 117.

Furthermore, vehicle control computer 116 may receive route data associated with vehicle 110 from an on-board navigation system and/or a navigation application operating on mobile computing device 117. The received route data may include a final destination for vehicle 110 and route information corresponding to the suggested route to arrive most efficiently at the final destination suggested by the navigation system and/or navigation application. Additionally, vehicle control computer 116 may receive location information associated with vehicle 110 from on-board GPS 114 and/or sensor 118 (e.g., GPS) from mobile computing device 118. The route and location data may be received by vehicle control computer 116 continuously and in real-time.

At step 506, vehicle control computer 116 may receive ancillary data of any of a plurality of types associated with the surroundings of vehicle 110 from any of a plurality of sources. For example, vehicle computer 116 may receive vehicle performance and operational data and internal vehicle conditions data, as described above in step 404, from the short-range communication systems of one or more additional vehicles 110a-n. The vehicle control computer 116 may output a polling request via short-range communication systems 113 for the vehicle performance and operational data and internal vehicle conditions data from the one or more additional vehicles 110a-n. The polling request may be output within a certain radial proximity from vehicle 110 (e.g., 5 feet, 100 feet, 500 feet, 1 mile, etc.). In some instances, vehicle make, model, and part data, as well as route data may also be requested from the one or more additional vehicles 110a-n. The vehicle performance and operational data and internal vehicle conditions data for the one or more additional vehicles 110a-n may be received by vehicle control computer 116 continuously and in real-time.

Additionally, ancillary data associated with the surroundings of vehicle 110 may include environmental conditions data provided by any one, or combination of, vehicle sensors 111, cameras and proximity sensors 112, mobile device 117, and/or third party data source server 130. In particular, vehicle sensors 111 and cameras and proximity sensors 112 may provide vehicle control computer 116 with environmental conditions data corresponding to the weather conditions as immediately experienced by vehicle 110. Such immediately experienced environmental conditions data may include an indication of precipitation, type of precipitation, volume of precipitation, temperature, presence of road ice, presence of fluid on road, ambient light levels, presence of fog, density of fog, sun position affecting driver visibility, presence of wind and/or wind gusts, velocity of wind and/or wind gusts, and the like. Mobile device 117 and/or third party data source server 130, on the other hand, may provide vehicle control computer 116 with expected and/or forecasted weather data associated with the area corresponding to a location of vehicle 110. Such forecasted weather data may include a likelihood of precipitation, wind, road ice, fog, and the like. The environmental conditions data, as determined by sensors 111, cameras and proximity sensors 112, mobile device 117, and/or third party data source server 130, may be provided to vehicle control computer 116 continuously and in real-time.

Furthermore, the ancillary data associated with the surroundings of vehicle 110 may include traffic data provided by any one, or combination of, vehicle sensors 111, cameras and proximity sensors 112, mobile device 117, a navigation system associated with vehicle control computer 116, and/or third party data source server 230. In particular, vehicle sensors 111 and cameras and proximity sensors 112 may traffic data to vehicle control computer 116 as immediately experienced by vehicle 110 in the area surrounding vehicle 110. The mobile device 117, via a navigation application, the on-board navigation system of vehicle control computer 116, and the third party data source server 130 may provide the vehicle control computer with traffic data associated with the projected route of vehicle 110. Such traffic data may be provided to vehicle control computer 110 continuously and in real-time.

Also, the ancillary data may include road type and quality data, which may be provided by vehicle sensors 111 and/or cameras and proximity sensors 112. In some instances, road type and quality data may be provided by a navigation application operating on mobile device 117. Road type and road quality data may be provided to vehicle control computer 110 continuously and in real-time.

In some instances steps 502, 504, and 506 may be performed sequentially. In other instances, steps 502, 504, and 506 may be performed simultaneously.

At step 508, through the utilization of multivariable close call detection algorithms, the multi-dimensional near short term risk score module 119 may be configured to calculate a risk score associated with the vehicle property data and the ancillary data based upon historical data provided by historical data source server 120 corresponding to the vehicle autonomy level. For instance, multi-dimensional near short term risk score module 119 may be configured to process and/or analyze the vehicle property data (e.g., vehicle performance and operational data, internal vehicle conditions, and vehicle route data for vehicle 110) in tandem with the ancillary data (e.g., vehicle performance and operational data, internal vehicle conditions data, and vehicle route data for one or more additional vehicles 110a-n, environmental conditions data, traffic data, and road type and road quality data) based on historical data corresponding to the vehicle autonomy level (e.g., claims data, accident data, etc.) to determine a risk score associated with each of the variables within the vehicle property data and the ancillary data (e.g., vehicle velocity, velocity of additional vehicles 110a-n, vehicle acceleration, acceleration of additional vehicles 110a-n, vehicle cruise control usage, vehicle hazard lights usage, vehicle windshield wiper usage, vehicle horn usage, vehicle indication of precipitation, vehicle type of precipitation, vehicle volume of precipitation, temperature, vehicle presence of road ice and/or moisture, etc.). In some instances, multi-dimensional near short term risk score module 119 may perform such calculations alone, or in tandem with multi-dimensional near short term risk score generation server 140. For example, depending on the complexity of the multivariable close call detection equations and processing power necessary to solve such equations, multi-dimensional near short term risk score generation server 140 may aid multi-dimensional near short term risk score module 119 in generating solutions and/or generating complete solutions. The risk score calculations may be performed continuously and in real-time.

In some instances, aspects of the above-noted multi-dimensional near short term risk score calculations may be performed by mobile computing device 117 in conjunction with one or more other devices. However, in other instances, mobile computing device 117 may be configured to receive the vehicle operational data and auxiliary data and may be configured to perform the multi-dimensional near short term risk score calculations independently from multi-dimensional near short term risk score module 119 and/or multi-dimensional near short term risk score generation server 140.

At step 510, the vehicle control computer 116 may transfer the vehicle from the first grade of vehicle autonomy to a second grade of vehicle autonomy different than first grade in order to alter the state of the vehicle property data and/or ancillary data and thereby lessen the risk level associated with the vehicle autonomy level, vehicle property data, and/or the ancillary data. In some examples, the amount of grade change (e.g., level 3 to level 2, level 1 to level 4, etc.) may be pre-set and/or pre-programmed by a driver of vehicle 110. Additionally, the vehicle control computer 116 may provide an alert to a driver of vehicle 110 that a grade change will occur and/or is occurring and may provide an additional alert to one or more additional vehicles 110a-n via short-range communication systems 113.

For example, vehicle 110 may be determined to be at a grade 0 (e.g., level 0) of autonomous functioning. Vehicle 110 may be decelerating from 65 mph on a 4-lane highway in heavy traffic. Responsive to such data, multi-dimensional risk score module 119 may indicate a moderate risk level. Accordingly, vehicle control computer 116 may cause vehicle 110 to provide a visual indication on the heads-up display that a grade change is pending (e.g., cause close call detection alerts) and may subsequently change the vehicle autonomy grade to 4.

FIG. 6 illustrates a block diagram of a computing device 601 in a close call detection system 600 that may be used according to one or more illustrative embodiments of the disclosure. The computing device 601 may have a processor 603 for controlling overall operation of the computing device 601 and its associated components, including RAM 605, ROM 607, input/output module 609, and memory unit 615. The computing device 601, along with one or more additional devices (e.g., terminals 641, 651) may correspond to any of multiple systems or devices, such as close call detection devices or systems, configured as described herein for receiving data from various sources, populating a rolling short term logical table with the received data, and eliciting a particular vehicular response based on the populated data items exceeding near short term (e.g., five seconds to five minutes) association thresholds.

Input/Output (I/O) module 609 may include a microphone, keypad, touch screen, and/or stylus through which a user of the computing device 601 may provide input, and may also include one or more of a speaker for providing audio input/output and a video display device for providing textual, audiovisual and/or graphical output. Software may be stored within memory unit 615 and/or other storage to provide instructions to processor 603 for enabling device 601 to perform various functions. For example, memory unit 615 may store software used by the device 601, such as an operating system 617, application programs 619, and an associated internal database 621. The memory unit 615 includes one or more of volatile and/or non-volatile computer memory to store computer-executable instructions, data, and/or other information. Processor 603 and its associated components may allow the computing device 601 to execute a series of computer-readable instructions to receive data from various sources, populate a rolling short term logical table with the received data, and elicit a particular vehicular response based on the populated data items exceeding near short term association thresholds.

The computing device 601 may operate in a networked environment 600 supporting connections to one or more remote computers, such as terminals/devices 641 and 651.

Close call detection device 601, and related terminals/devices 641 and 651, may include devices installed in vehicles, mobile devices that may travel within vehicles, or devices outside of vehicles that are configured to receive and process vehicle and other sensor data. Thus, the computing device 601 and terminals/devices 641 and 651 may each include personal computers (e.g., laptop, desktop, or tablet computers), servers (e.g., web servers, database servers), vehicle-based devices (e.g., on-board vehicle computers, short-range vehicle communication systems, sensors and telematics devices), or mobile communication devices (e.g., mobile phones, portable computing devices, and the like), and may include some or all of the elements described above with respect to the computing device 601. The network connections depicted in FIG. 6 include a local area network (LAN) 625 and a wide area network (WAN) 629, and a wireless telecommunications network 633, but may also include other networks. When used in a LAN networking environment, the computing device 601 may be connected to the LAN 625 through a network interface or adapter 623. When used in a WAN networking environment, the device 601 may include a modem 627 or other means for establishing communications over the WAN 629, such as network 631 (e.g., the Internet). When used in a wireless telecommunications network 633, the device 601 may include one or more transceivers, digital signal processors, and additional circuitry and software for communicating with wireless computing devices 641 (e.g., mobile phones, short-range vehicle communication systems, vehicle sensing and telematics devices) via one or more network devices 635 (e.g., base transceiver stations) in the wireless network 633.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, Wi-Fi, and WiMAX, is presumed, and the various computing devices and multi-dimensional risk score generation system components described herein may be configured to communicate using any of these network protocols or technologies.

Additionally, one or more application programs 619 used by the computing device 601 may include computer executable instructions for receiving data and performing other related functions as described herein.

As will be appreciated by one of skill in the art, the various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method comprising:
   determining, by a computing device, a current autonomy level of an autonomous vehicle configured to operate in accordance with a plurality of autonomy levels, wherein each autonomy level corresponds to a different set of one or more autonomous control functions;
   receiving vehicle property data corresponding to the autonomous vehicle and ancillary data associated with surroundings of the autonomous vehicle;
   receiving historical data corresponding to the current autonomy level of the autonomous vehicle;
   calculating, based on the historical data corresponding to the current autonomy level of the autonomous vehicle, one or more risk scores for the vehicle property data and the ancillary data;
   causing, based on the one or more risk scores, a close call detection action to alter the current autonomy level of the autonomous vehicle from a first level to a second level in accordance with a preprogrammed setting associated with the autonomous vehicle, wherein the second level is associated with a lower risk level than the first level;
   performing a set of autonomous control functions corresponding to the second level based on the alteration to the current autonomy level; and
   causing, based on the close call detection action, a close call detection alert to be performed.

2. The method of claim 1, wherein performing the close call detection alert includes transmitting a report to a remote computing device; and further comprising receiving, from the remote computing device, one or more vehicle control instructions, wherein performing the set of autonomous control functions is further based on the one or more vehicle control instructions.

3. The method of claim 1, further comprising:
   transmitting, to a remote computing device associated with a second vehicle, instructions to perform a second close call alert.

4. The method of claim 1, wherein the vehicle property data comprises at least one of: vehicle performance and operation data for the autonomous vehicle, internal vehicle conditions data for the autonomous vehicle, and route data for the autonomous vehicle, and
   wherein the ancillary data comprises at least one of: performance and operation data for one or more additional vehicles different from the autonomous vehicle, internal vehicle conditions data for the one or more additional vehicles, route data for the one or more additional vehicles, environmental conditions data associated with the surroundings of the autonomous vehicle, and traffic data associated with the surroundings of the autonomous vehicle.

5. The method of claim 1, wherein the close call detection action further comprises at least one of: activating brakes of the autonomous vehicle, causing the autonomous vehicle to change lanes, disabling a mobile device of a driver of the autonomous vehicle, disabling acceleration of the autonomous vehicle, turning on vehicle headlights, reducing a speed of the autonomous vehicle, and turning on emergency lights of the autonomous vehicle.

6. The method of claim 1, wherein the close call detection alert comprises at least one of: flashing interior lights of the autonomous vehicle, producing an audible sound in an interior of the autonomous vehicle, suggesting an alternate route for the autonomous vehicle, and providing an indication of upcoming traffic on a dashboard and/or heads-up display unit of the autonomous vehicle.

7. The method of claim 1, wherein the vehicle property data comprises a first plurality of variables,
   wherein the ancillary data comprises a second plurality of variables, and
   wherein calculating the one or more risk scores comprises calculating a risk score for each of the first plurality of variables of the vehicle property data and each of the second plurality of variables of the ancillary data.

8. The method of claim 1, further comprising:
   populating a near short term logical table with the one or more risk scores; and
   configuring, based on the near short term logical table, a vehicle control computer of the autonomous vehicle,
   wherein the close call detection action is performed by the vehicle control computer in accordance with the configuration based on the near short term logical table.

9. The method of claim 1, wherein the computing device comprises a vehicle control computer or a mobile device.

10. A computing device comprising:
    one or more processors; and
    memory storing computer-readable instructions that, when executed by the one or more processors, cause the computing device to:
       determine a current autonomy level of an autonomous vehicle configured to operate in accordance with a plurality of autonomy levels, wherein each autonomy level corresponds to a different set of one or more autonomous control functions;
       receive vehicle property data corresponding to the autonomous vehicle and ancillary data associated with surroundings of the autonomous vehicle;
       receive historical data corresponding to the current autonomy level of the autonomous vehicle;
       calculate, based on the historical data corresponding to the current autonomy level of the autonomous vehicle, one or more risk scores for the vehicle property data and the ancillary data;
       cause, based on the one or more risk scores, a close call detection action to alter the current autonomy level of the autonomous vehicle from a first level to a second level in accordance with a preprogrammed setting associated with the autonomous vehicle, wherein the second level is associated with a lower risk level than the first level;
       performing a set of autonomous control functions corresponding to the second level based on the alteration to the current autonomy level; and
       cause, based on the close call detection action, a close call detection alert to be performed.

11. The computing device of claim 10, wherein the instructions, when executed by the one or more processors, further cause the computing device to:
    perform the close call detection action by transmitting a report to a remote computing device; and
    receive, from the remote computing device, one or more vehicle control instructions, wherein performing the set of autonomous control functions is further based on the one or more vehicle control instructions.

12. The computing device of claim 10, wherein the instructions, when executed by the one or more processors, further cause the computing device to:
   transmit, to a remote computing device associated with a second vehicle, instructions to perform a second close call alert.

13. The computing device of claim 10, wherein the vehicle property data comprises at least one of: vehicle performance and operation data for the autonomous vehicle, internal vehicle conditions data for the autonomous vehicle, and route data for the autonomous vehicle, and
   wherein the ancillary data comprises at least one of: performance and operation data for one or more additional vehicles different from the autonomous vehicle, internal vehicle conditions data for the one or more additional vehicles, route data for the one or more additional vehicles, environmental conditions data associated with the surroundings of the autonomous vehicle, and traffic data associated with the surroundings of the autonomous vehicle.

14. The computing device of claim 10, wherein the close call detection action further comprises at least one of: activating brakes of the autonomous vehicle, causing the autonomous vehicle to change lanes, disabling a mobile device of a driver of the autonomous vehicle, disabling acceleration of the autonomous vehicle, turning on vehicle headlights, reducing a speed of the autonomous vehicle, and turning on emergency lights of the autonomous vehicle, and
   wherein the close call detection alert comprises at least one of: flashing interior lights of the autonomous vehicle, producing an audible sound in an interior of the autonomous vehicle, suggesting an alternate route for the autonomous vehicle, and providing an indication of upcoming traffic on a dashboard and/or heads-up display unit of the autonomous vehicle.

15. The computing device of claim 10, wherein the vehicle property data comprises a first plurality of variables,
   wherein the ancillary data comprises a second plurality of variables, and
   wherein the instructions, when executed by the one or more processors, further cause the computing device to calculate the one or more risk scores by calculating a risk score for each of the first plurality of variables of the vehicle property data and each of the second plurality of variables of the ancillary data.

16. The computing device of claim 10, wherein the instructions, when executed by the one or more processors, further cause the computing device to:
   populate a near short term logical table with the one or more risk scores;
   configure, based on the near short term logical table, a vehicle control computer of the autonomous vehicle, wherein the close call detection action is performed by the autonomous vehicle control computer in accordance with the configuration based on the near short term logical table.

17. The computing device of claim 10, wherein the computing device comprises a vehicle control computer or a mobile device.

18. A non-transitory, computer-readable storage media storing instructions that, when executed by a computing device, cause the computing device to:
   determine a current autonomy level of an autonomous vehicle configured to operate in accordance with a plurality of autonomy levels, wherein each autonomy level corresponds to a different set of one or more autonomous control functions;
   receive vehicle property data corresponding to the autonomous vehicle and ancillary data associated with surroundings of the autonomous vehicle;
   receive historical data corresponding to the current autonomy level of the autonomous vehicle;
   calculate, based on the historical data corresponding to the current autonomy level of the autonomous vehicle, one or more risk scores for the vehicle property data and the ancillary data;
   cause, based on the one or more risk scores, a close call detection action to alter the current autonomy level of the autonomous vehicle from a first level to a second level in accordance with a preprogrammed setting associated with the autonomous vehicle, wherein the second level is associated with a lower risk level than the first level;
   performing a set of autonomous control functions corresponding to the second level based on the alteration to the current autonomy level; and
   cause, based on the close call detection action, a close call detection alert to be performed.

19. The non-transitory, computer-readable media of claim 18, wherein the instructions, when executed by the computing device, further cause the computing device to:
   perform the close call detection alert by transmitting a report to a remote computing device; and
   receive, from the remote computing device, one or more vehicle control instructions, wherein performing the set of autonomous control functions is further based on the one or more vehicle control instructions.

20. The non-transitory, computer-readable media of claim 18, wherein the instructions, when executed by the computing device, further cause the computing device to:
   transmit, to a remote computing device associated with a second vehicle, instructions to perform a second close call alert.

* * * * *